Dec. 18, 1923.  
N. WEBSTER  
VARIABLE GEAR  
Filed May 7, 1923  
1,478,075  
2 Sheets-Sheet 1
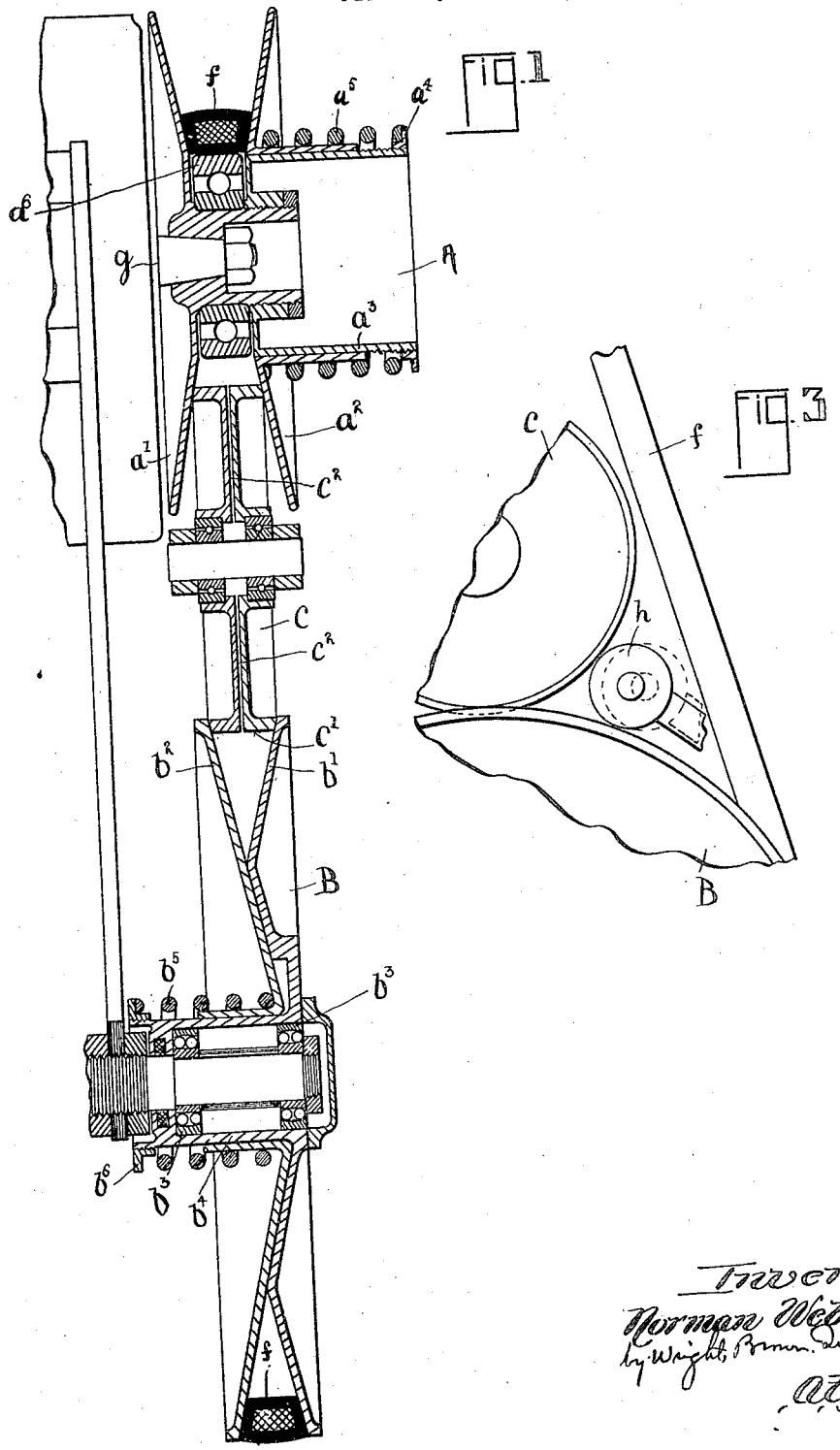

Dec. 18, 1923.   N. WEBSTER   1,478,075
VARIABLE GEAR
Filed May 7, 1923   2 Sheets-Sheet 2
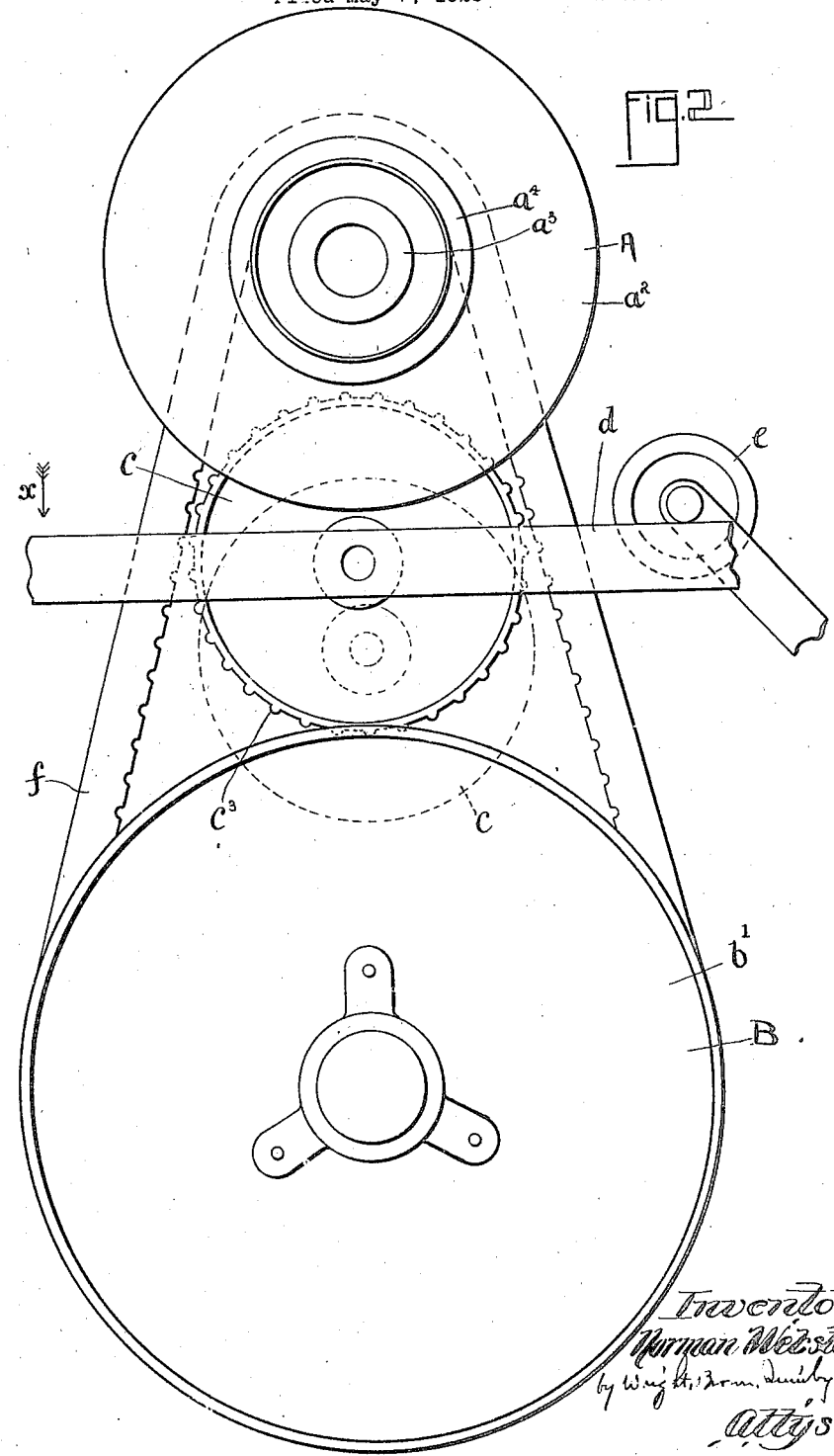

Patented Dec. 18, 1923.

1,478,075

UNITED STATES PATENT OFFICE.

NORMAN WEBSTER, OF MOORTOWN, LEEDS, ENGLAND, ASSIGNOR TO PHILIPSON AND COMPANY LIMITED, OF BOLTON, LANCASTER, ENGLAND.

VARIABLE GEAR.

Application filed May 7, 1923. Serial No. 637,130.

*To all whom it may concern:*

Be it known that I, NORMAN WEBSTER, of 3 Valley Terrace, Moortown, Leeds, in the county of York, England, have invented certain new and useful Improvements in Variable Gears (for which I have filed an application in Great Britain, Feb. 14, 1922), of which the following description, together with the accompanying sheets of drawings, is a specification.

My invention relates to variable gear devices of the type wherein V pulleys are used in conjunction with a V belt, the flanges of the V pulleys being capable of expansion or contraction to allow the belt to run on a larger or smaller diameter thereof as may be necessary in order to obtain the various ratios between the driving pulley and the driven pulley to bring about the required speeds as is well known. The object of this invention is the provision of means or mechanism whereby many such ratios may be readily obtained by the simple movement of a lever or the like situated in a convenient position on the frame of the car or cycle to enable said lever to be readily manipulated. Moreover by these improved devices I am also enabled to accomplish these changes with very little wear to the parts or mechanism employed and to effect the changes silently. To attain these objects I make use of two V pulleys one of which is the driving pulley and the other the driven pulley and over each pulley passes a correspondingly shaped belt and between which pulleys is a friction wheel or roller that transmits or helps to transmit the power from one pulley to the other and also functions as a means of varying the path of the belt contacts on the said pulley. In order that my said invention may be readily understood, I have hereunto appended a sheet of drawings illustrative thereof, to which by figures and letters, reference is made in the following statement:—

Fig. 1 is a sectional side elevation of my improved gear.

Fig. 2 is a front view thereof.

Fig. 3 shows a front view of a modification of one part thereof.

Similar figures and letters of reference indicate like parts throughout the several views.

In carrying my invention into effect I mount upon the engine shaft $b$ of the machine a V pulley A which comprises a fixed flange $a^1$ and a slidable flange $a^2$, the latter being provided with a sleeve which takes over the boss $a^3$. A castle nut or the like $a^4$ is screwed or fixed over the end or boss $a^3$ and against this takes a spring $a^5$ the other end thereof abutting the outer face of the slidable flange $a^2$. This spring $a^5$ is of just sufficient strength to ensure the transmission of power as hereinafter explained but allows the flange $a^2$ to be moved or slid upon the boss $a^3$ when this movement is desired as is explained later.

In any suitable position on the framework of the machine I mount a V pulley B consisting of a fixed flange $b^1$ and a slidable flange $b^2$. The fixed flange $b^1$ is mounted upon an appropriate ball race $b^3$ and upon the boss $b^4$ of this flange $b^1$ the sleeve of the slidable flange $b^2$ is situated. A spring $b^5$ is inserted between the castle nut or like device $b^6$ and the outer face of the flange $b^2$ and thus tends always to retain the flanges in their closed position.

Between the two pulleys A B mounted on a lever $d$ or other device as may be found desirable or more convenient is a friction wheel or roller C which makes contact with the V face of both pulleys in such manner that the width of the contacting part $c^1$ is equal to the width of the belt. The friction wheel C performs a dual function; by moving the wheel C in the direction of the arrow $x$ the flange $b^2$ of the pulley $b$ is moved away from the contiguous flange $b^1$ and the flange $a^2$ is allowed under the force of the spring $a^4$ to close towards the fixed flange $a^1$ so that the force on the two sliding flanges $a^2$ and $b^2$ is always sufficient to ensure that the belt and the friction wheel C will be gripped with adequate pressure to cause the transmission of power from one pulley to the other to be effected in the required manner. It will be observed that the diameter of the belt contacting surface of either of the pulleys $a$ or $b$ at any time is equal to the diameter of the friction wheel contacting surface of that pulley at that time in all circumstances or in all positions that the wheel C may occupy. This causes the speeds of the contacting surfaces of the wheel C and the belt to be the same or very nearly the same so that they both tend to drive the pulley $b$ at the same speed. In order that the belt and the wheel C may be subject to the same or approximately the same pressure of contact by the flanges of the two V pulleys I may construct the wheel $c$ in two parts as shown in Fig. 1 and insert between them a spring $c^2$ of sufficient strength to allow for any slight difference in such pressure as might otherwise exist.

Upon the boss $a^3$ of the pulley A I mount a ring $a^6$ which is provided with a ball race and the ring is such that when the flange $a^2$ is moved from the flange $a^1$ to its extreme position by the corresponding raising or movement of the wheel $c$ then the belt rests upon the ring $a^6$ which allows same to be stationary and thus no drive is transmitted from the belt to the pulley B. Also in this extreme position of the wheel C said wheel is just clear of the flanges of the ball B which flanges on the limit of their approach allow this slight clearance as will be understood by reference to Fig. 1.

The action is as follows:—

1. Suppose the engine to be running freely then the belt will be resting upon the ring $a^6$ and no motion will be given thereto. This is the position when the wheel C is slightly raised from that shown by Fig. 1. The said wheel C is now clear of the pulley B but is being driven by the pulley A. By providing the wheel C with teeth or projections $c^3$ I may if desired very conveniently arrange a ball bearing roller, wheel or drum $e$ as shown by Fig. 2 so that this may be caused to engage with the belt and depress same into contact with the wheel C which would then transmit motion thereto and drive the pulley B in a reverse direction. When it is desired to put the pulley B into gear for a forward direction the wheel C is moved in a direction away from the pulley A and towards the pulley B, the flange $a^2$ closing and the flange $b^2$ opening and allowing the belt to assume the necessary position that the driving thereof may be effected. By moving the wheel C further in the said direction the ratio of the diameters of the belt contacting parts of the pulleys A and B is further modified or changed and a still higher gear is obtained. A still further movement brings the wheel C into such a position to give the highest gear as will be understood. It will be observed that as the sliding flanges of the pulleys A and B are situated obliquely or on opposite sides of the belt the alignment or centralization of the various moving parts is assured. Instead of obtaining the reverse drive of the pulley B in the manner aforesaid I may employ any other means for example I may employ an intermediate wheel to be inserted between the wheel C and the pulley B when these latter are out of engagement.

The lever $d$ is of any appropriate character and is connected and actuated in any suitable manner according to the machine to which it has to be fitted.

I wish it to be understood that although I have described my improved gear as applied to a motor cycle or car it may be applied to many other machines wherein this type of gearing is present or which may be employed.

Such being the nature and object of my said invention that what I claim is:—

1. In a variable speed mechanism, the combination of two expanding pulleys having peripheral grooves, a drive belt connecting said pulleys, and a wheel between said pulleys adapted to operatively engage said grooves.

2. In a variable speed mechanism, the combination of two expanding pulleys having peripheral grooves, a drive belt connecting said pulleys, and an expansible wheel between said pulleys adapted to operatively engage said grooves.

3. In a variable speed mechanism, the combination of two expanding pulleys having peripheral grooves, a drive belt connecting said pulleys, an expansible wheel being said pulleys adapted to operatively tween said pulleys adapted to operatively engage said grooves, and means for regulating the frictional engagement of said wheel relative to each of said pulleys whereby different ratios of drive may be obtained.

4. In a variable speed mechanism, the combination of two expanding pulleys having peripheral grooves, a drive belt connecting said pulleys, an expansible wheel being said pulleys adapted to operatively tween said pulleys adapted to operatively engage said grooves, and means associated with said wheel for uniformly distributing pressure on the drive belt and wheel.

5. In a variable speed mechanism, the combination of two expanding pulleys having peripheral grooves, a drive belt connecting said pulleys, an expansible wheel being said pulleys adapted to operatively tween said pulleys adapted to operatively engage said grooves, and means associated with one of said pulleys for causing the belt to run idle.

6. In a variable speed mechanism, the combination of two expanding pulleys having peripheral grooves, a drive belt connecting said pulleys, an expansible wheel being said pulleys adapted to operatively tween said pulleys adapted to operatively engage said grooves, means for regulating the frictional engagement of said wheel relative to each of said pulleys whereby different ratios of drive may be obtained, a ring associated with one of said pulleys, a ball race on said ring, and means for causing the belt to run idle when the wheel is moved to one of its extreme positions.

In testimony I have signed my name to this specification in the presence of two subscribing witnesses.

NORMAN WEBSTER.

Witnesses:
 ERNEST HEY,
 M. OPENSHAW.